United States Patent
Pecoraro et al.

(10) Patent No.: US 10,089,187 B1
(45) Date of Patent: Oct. 2, 2018

(54) SCALABLE CLOUD BACKUP

(71) Applicant: EMC Corporation, Hopkinton, MA (US)

(72) Inventors: Alex Pecoraro, Seattle, WA (US); Nick Kirsch, Seattle, WA (US); Daniel Forrest, University Place, WA (US); Shaun Edwards, Edgewood, WA (US); Ganesh Prabhu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 256 days.

(21) Appl. No.: 15/084,208

(22) Filed: Mar. 29, 2016

(51) Int. Cl.
*G06F 17/30* (2006.01)
*G06F 11/14* (2006.01)
*H04L 29/08* (2006.01)

(52) U.S. Cl.
CPC ...... *G06F 11/1451* (2013.01); *H04L 67/1097* (2013.01); *G06F 2201/80* (2013.01)

(58) Field of Classification Search
CPC ............. G06F 17/302; G06F 17/30082; G06F 17/30215
USPC .................................. 707/646, 640, 664, 694
See application file for complete search history.

(56) References Cited

U.S. PATENT DOCUMENTS

| | | | | |
|---|---|---|---|---|
| 8,285,681 | B2 * | 10/2012 | Prahlad ................. | G06F 17/302 707/640 |
| 8,612,439 | B2 * | 12/2013 | Prahlad ................. | G06F 17/302 707/640 |
| 2010/0332401 | A1 * | 12/2010 | Prahlad ............. | G06F 17/30082 705/80 |
| 2010/0332456 | A1 * | 12/2010 | Prahlad ............. | G06F 17/30082 707/664 |
| 2010/0333116 | A1 * | 12/2010 | Prahlad ............. | G06F 17/30082 719/328 |
| 2013/0024424 | A1 * | 1/2013 | Prahlad ............. | G06F 17/30082 707/640 |
| 2015/0012495 | A1 * | 1/2015 | Prahlad ............. | G06F 17/30082 707/640 |
| 2017/0039218 | A1 * | 2/2017 | Prahlad ............. | G06F 17/30082 |

* cited by examiner

*Primary Examiner* — Jean M Corrielus
(74) *Attorney, Agent, or Firm* — Krishnendu Gupta; Sean M. Evans

(57) ABSTRACT

Implementations are provided for scalable cloud backup. A coordinator process can manage worker processes on nodes to package file system data that is targeted for cloud backup into node local upload objects. File data can be arranged into distinct block offsets of the node local upload object. A set of metadata tables can be generated that characterize each file that is backed up as well as file block location information for each data block. The node local upload objects can be uploaded to a cloud service provider. The set of metadata tables generated by the worker process can be coalesced into a global set of metadata tables that describe the data that has been backed up. In one implementation, after an initial cloud backup has occurred, a snapshot service of the file system can be used to incrementally backup blocks of the file that have been changed.

18 Claims, 11 Drawing Sheets

| POLICY NAME | LIN | FILE PATH | SNAPSHOT ID | TIME | PERMISSIONS | ITEM TYPE | GROUP ID | USER ID | MOD TIME | FILE SIZE |
|---|---|---|---|---|---|---|---|---|---|---|
| POLICY 1 | 001 | /FOO/001 | 001 | XX/YY/ZZ | RWX | 1 | 001 | USER 1 | XX/YY/ZZ | 10 KB |
| POLICY 1 | 002 | /FOO/002 | 001 | XX/YY/ZZ | -WX | 3 | 001 | USER 1 | XX/YY/ZZ | 50 MB |
| POLICY 2 | 050 | /FOO/BAR/050 | 002 | XX/YY/ZZ | R-- | 4 | 002 | USER 10 | XX/YY/ZZ | 15 GB |

| LIN | BASE | B# |
|---|---|---|
| LOGICAL INODE OF FILE | BASE INDEX FOR ROW, BLOCKS ARE ENCODED B0-B9 | [OBJECT NAME] [START OFFSET] [SIZE] FOR EACH OF 10 BLOCKS IN BASE |

SCALABLE CLOUD BACKUP

FIELD OF THE INVENTION

This invention relates generally to distributed file systems, and more particularly to implementations for a scalable cloud backup capability for a cluster of nodes operating as a distributed file system.

BACKGROUND OF THE INVENTION

Distributed file systems offer many compelling advantages in establishing high performance computing environments. One example is the ability to easily expand, even at large scale. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. A cluster of nodes, in some cases, can provide easy scalability by providing for new nodes to be added to the cluster of nodes to increase the amount of storage space within the distributed file system and/or to meet other needs of the users of the distributed file system.

Some distributed file systems can also regularly sync with a backup cluster of nodes. The backup cluster of nodes can operate as an independent file system to the primary cluster of nodes. Data can be cloned on the backup cluster of nodes and periodically updated to include changes made on the primary cluster of nodes. For example, using a snapshot based change identification model to changed files of the file system, block based updates can be made to the backup cluster of nodes that solely require sending modified portions of files to the backup cluster of nodes. A backup cluster of nodes can operate to provide a safe backup from a potential disaster recovery where the primary cluster of nodes has suffered total failure. However, for some use cases, it may not be economical or feasible to locate a backup cluster of nodes geographically separate from the primary cluster of nodes such that a potential disaster does not affect the backup cluster of nodes as well.

One common approach to disaster recovery is to use offsite Tape backup. Using a protocol such as NDMP, a file system can dump an image of its data onto a physical tape backup and that tape backup can then be geographically dispersed from the file system. However, tape backup can consume resources and time making it difficult to scale. One means for addressing this is to use cloud storage services as the backup target. It can be appreciated that cloud storage systems can be operated independent of the primary cluster of nodes and thereby less prone to a single a disaster event affecting both the primary cluster of nodes and the cloud storage backup. It can also be appreciated that cloud storage services can be more efficient and more convenient than tape backups.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a cloud backup policy can be established wherein the cloud backup policy is associated with a backup set of files and directories of the distributed file system. A cloud backup coordinator process can be initiated on a coordinator node among the cluster of nodes. A set of worker processes can be initiated by the cloud backup coordinator process wherein a worker process among the set of worker processes is assigned to each node in the cluster of nodes, wherein the set of worker processes are in communication with the cloud backup coordinator process. At least one of the backup set of files and directories can be assigned to each worker processes in the set of worker processes. For each worker process in the set of worker processes, at least one assigned backup set of files and directories can be packaged into a node local upload object wherein the packaging includes arranging the set of data blocks associated with the at least one backup set of files and directories into the node local upload object and generating a set of metadata tables associated with the node local upload object. In response to at least one of the node local upload object reaching an object capacity or the worker process finishing, packaging the at least one backup set of files and directories into the node local upload object, uploading the node local object and the set of metadata tables associated with the node local object to a cloud storage provider. The set of metadata tables associated with each uploaded node local object can be coalesced into a cloud hosted metadata table and a cloud hosted file block location table.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 3 illustrates an example metadata table in accordance with implementations of this disclosure

FIG. 11 illustrates an example metadata table in accordance with implementations of this disclosure.

DETAILED DESCRIPTION

Figure 1:
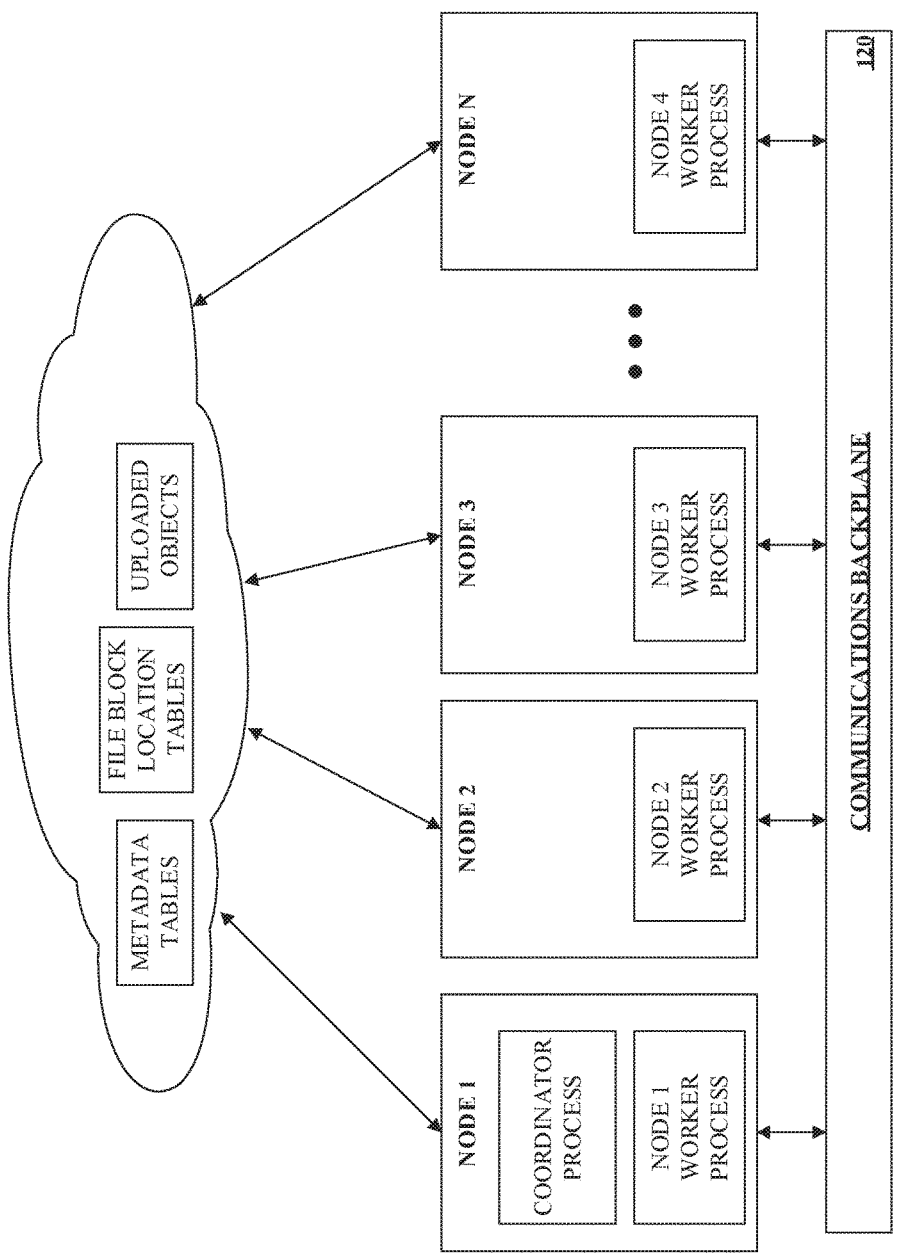
FIG. 1 illustrates an example cluster of nodes including a coordinator process and worker processes facilitating scalable cloud backup in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" or "LIN" as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The term "coordinator process" refers to a process that manages the accomplishing of tasks across multiple nodes of the cluster. The process can be established on a coordinator node and can distribute a plurality of tasks to nodes among the cluster of nodes. In some implementations, the coordinator process can assign tasks to the same node the coordinator process is executing on. In some implementations, the coordinator process can spin up and down on differing nodes of the cluster of nodes during the pendency of completing the set of work the process was designed to accomplish. For example, a coordinator process can begin on a first node and after assigning work items to a set of worker processes, can be spun down and later spun up a second node to further accomplish the coordinator process. In one implementation, the coordinator process can communicate bi-directionally with worker processes to monitor the progress of worker processes.

The term "worker process" refers to a node local process that receives requests and/or work items from the coordinator process. Worker processes generally do not communicate with other worker processes and are solely directed by the coordinator process. Worker processes can communicate the status of their work items to the coordinator process.

Implementations are provided herein for scalable cloud backup of a distributed file system. A coordinator process can be established that uses worker processes on each node, or a subset of nodes, to package file system data that is targeted for cloud backup into node local upload objects. File data can be arranged into distinct block offsets of the node local upload object, and a single node local upload object can contain data associated with multiple files and/or directories. A set of metadata tables can be generated that characterize each file that is backed up as well as file block location information for each data block of files that are packaged within node local upload objects. The node local upload objects can be packaged over time and once an object capacity is reached, or alternatively at other configurable thresholds, the node local upload object can be uploaded to a cloud service provider for storage on the cloud service provider's storage platform. The set of metadata tables generated by the worker process on the node when packaging the node local upload object can also be uploaded to the cloud service provider's storage platform and coalesced into a global set of metadata tables that describe the data that has been backed up, including block location data for uploaded objects.

In one implementation, after an initial cloud backup has occurred, a snapshot service of the file system can be used to incrementally backup blocks of files that have been changed since the previous backup. It can be appreciated that by using snapshots for backing up incremental changes to the file system, network traffic can be minimized as individual blocks of files and/or directories unchanged since the previous snapshot should not need to be recopied to cloud storage. It can be appreciated that as some files are overwritten and/or modified, only a portion of the file is actually changed and some blocks of file data remain unchanged. An incremental snapshot system can identify changed blocks within a file that need to be backed up and avoid backing up data blocks that already exist in the backup location. For example, using a copy on write snapshot system, as data is written to the source cluster, the newly written data blocks can be synced to the cloud storage provider incrementally upon each write, a batch of writes, or upon custom sync or snapshot settings. To support a batch of writes, changelists can be maintained on the distributed file system that aggregate changes to the file system since the last iterative cloud backup. For example, a snapshot can be taken of the files targeted for cloud backup at the time the data from the files is backed up, and the snapshot system can be used to track changes to snapshotted files.

In one implementation, some of the cloud backup objects can be moved from general purpose cloud storage to cold cloud storage to reduce the ongoing costs of cloud backup. Cloud objects that are moved to cold cloud storage can be flagged for use by a restoration process as described below.

In one implementation, the set of metadata tables stored within the cloud storage provider can be analyzed (e.g., by downloading the tables from the cloud storage provider to the distributed file system) to determine if there are any previously uploaded backup objects that no longer contain active references to file data that is necessary for backup. For example, as incremental changes to files are stored in a scalable cloud backup, some backup objects stored within the cloud may contain data blocks that are no longer relevant (e.g., expired data). It can be appreciated that in most object based cloud storage systems, objects are not modifiable, and therefore any incremental changes to files on the primary file system are uploaded into new objects to cloud storage. Therefore, as data is modified, references to unmodified data within cloud objects may no longer be necessary to retain. However, in some implementations, it may not be desirable or possible to delete portions of a cloud object and that the entirety of the cloud object must expire before the object in its entirety can be discarded.

In one implementation, files can be restored from cloud based backup. A worker can be established for each file/directory that needs to be restored. The worker can use the cloud hosted metadata table data and the cloud hosted file block location table data to determine the offset locations within the cloud objects where the data blocks of the file to be restored are stored. The worker can then stitch the blocks together from different objects and/or the same object to generate the file on the distributed file system. For example, the restoration process can sequentially download from the cloud service provider only the block locations from objects the worker has assessed it needs to construct the file.

In implementations where some objects have been moved to cold cloud storage, the restoration process can identify objects that were flagged as such and initiate a restoration process that moves any objects necessary for the restoration from cold cloud storage to normal cloud storage. It can be appreciated that in some cloud storage environments, to support the reduced costs of cold cloud storage, the cloud storage provider imposes a delay when accessing the data. During the pendency of the delay, the restoration process can proceed with restoring data that is in normal cloud storage (e.g., cloud storage locations with objects that are available as immediate restoration targets).

Referring now to FIG. 1, there is illustrated an example cluster of nodes including a coordinator process and worker processes facilitating scalable cloud backup in accordance with implementations of this disclosure. Node 1, Node 2, Node 3, and Node N (where "N" is an integer greater than 3") represent a cluster of nodes that make up a distributed file system. The nodes can run a common operating system, such as EMC Isilon OneFS, and can be in communication with each other through a communications backplane 120. A coordinator process, depicted on Node 1 for ease of expla- nation, can be initiated on any node among the cluster of nodes. The coordinator process manages the overall set of tasks necessary for scalable cloud backup. It can be appreciated that the coordinator process can be spun down after delegating work items to worker processes and then spun back up when necessary to direct further actions. It can be further appreciated that the coordinator process can be spun back up on a different node than Node 1 without compromising the scalable cloud backup process.

The coordinator process can initiate node local worker processes to process the coordinator processes instructions. Each node in the cluster of nodes can be in communication with external networks (e.g., network locations external to the cluster of nodes) such as the cloud service provider depicted in FIG. 1. Nodes can upload objects to the cloud service provider and coalesce data into the metadata tables and file block location tables as described in implementations of this disclosure.

A cloud backup policy can be established whereby the cloud backup policy can describe the framework for the cloud backup. For example, the cloud backup policy could apply to the entire file system or a subset of the files, directories and other data structures that make up the distributed file system. The cloud backup policy can also contain the name, network configuration, and authentication information to the cloud services provider; a maximum cloud object size; a time limit for uploading incomplete (e.g., less than maximum cloud object size) node local upload objects; snapshot identifiers associated with the cloud backup policy; permissions for users who can modify the cloud policy, etc. It can be appreciated that multiple cloud backup policies can exist for the distributed file system. For example, one cloud backup policy could backup a different set of data than a second cloud backup policy. In another example, two cloud backup policies could reference the same set of data, but one could backup data to a first cloud services provider, and a second could backup data to a second cloud services provider.

Figure 2:
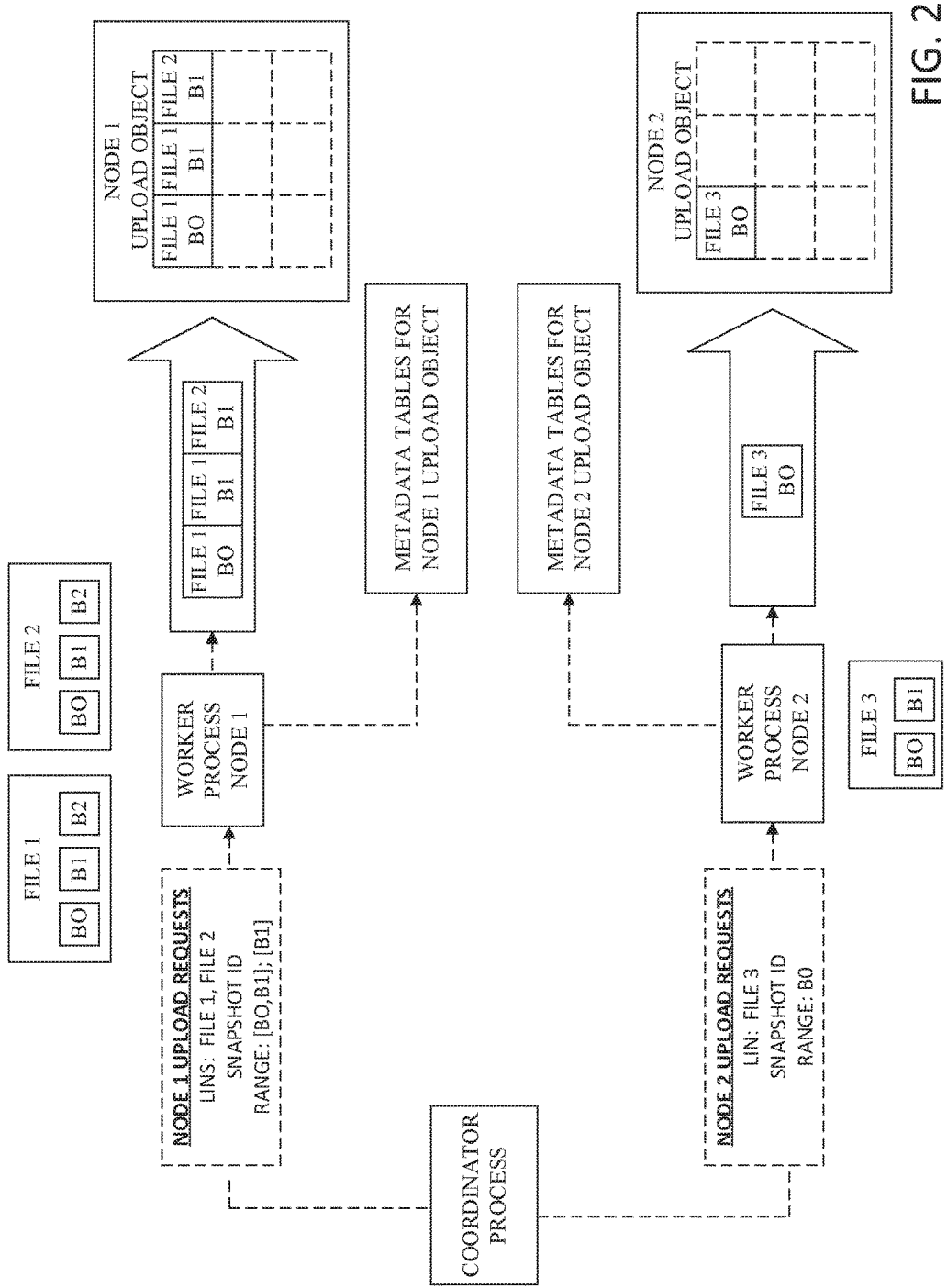
FIG. 2 illustrates an example coordinator process, worker processes, and object packaging in accordance with implementations of this disclosure.

Referring now to FIG. 2, there is illustrated an example coordinator process, worker processes, and object packaging in accordance with implementations of this disclosure. The coordinator process can send upload requests to worker processes on the various nodes of the cluster of nodes. The coordinator process can manage the workflow of how many upload requests are sent to each node, and in some implementations, whether a node is sent any upload requests. For example, some nodes may have fewer resources to devote to scalable cloud backup than other nodes due to existing workloads or non-uniform node hardware (e.g., more or less CPU resources, memory resources, network resources, etc.).

In this example, a worker process on Node 1 is established, and the coordinator process has assigned it two upload requests. The upload requests can be made through the use of LINs of the files, as each file has a unique LIN associated with it. A snapshot identifier can also be associated with the request to ensure data integrity. For example, its possible data has been changed after the coordinator process assigned an upload, so through confirming a snapshot identifier, the proper version of the file can be flagged for upload. Additionally, a block range of each file can be specified. For example, as discussed above with regard to incremental changes in a snapshot based system, only changed blocks after a file modification will need to be uploaded to cloud backup as unchanged blocks are already stored in existing cloud objects.

In one implementation, using the LIN of the file, the worker process can find a local block address location of the distributed file system to find the data the coordinator process is requesting be uploaded into the cloud storage. The worker process can continue to package individual data blocks into an upload object. For example, Worker Process Node 1, in response to the Node 1 upload requests, packages File 1-Block 0; File 1-Block 1; and File 2-Block 1 into the Node 1 upload object. Worker Process Node 1 can continue to wait for upload requests form the coordinator process to keep filling Node 1 Upload Object. In one implementation, when Node 1 Upload object reaches a maximum capacity in size, the object can be uploaded to the cloud storage provider. In one implementation, when Node 1 Upload object reaches a time limit of inactivity, a less than capacity sized Node 1 Upload Object and be uploaded to cloud storage. In one implementation, the Coordinator Process can instruct Worker Process Node 1 to package a less than capacity sized Node 1 Upload Object and upload it to cloud storage.

In one implementation, when Node 1 Upload Object is uploaded to cloud storage, a new Node 1 Upload Object can be generated for new Node 1 Upload Requests received form the Coordinator Process.

Worker Process Node 1 can also build a set of metadata tables for the Node 1 Upload Object it is packaging. The contents of the metadata table it is packaging are described more fully with respect to FIG. 3 below. When uploading Node 1 Upload Object, the set of metadata tables for the object can also be uploaded and coalesced with exiting metadata tables already residing within cloud storage.

In one implementation, in parallel to Worker Process Node 1 packaging blocks into Node 1 Upload Object and constructing the Metadata Table for Node 1 Upload Object, Worker Process Node 2 can be constructing Node 2 Upload Object and constructing the Metadata Table for Node 2 Upload Object.

Referring now to FIG. 3, there are illustrated an example metadata table in accordance with implementations of this disclosure. FIG. 3 illustrates an example cloud hosted metadata table. The cloud hosted metadata table is maintained by coalescing new entries from worker processes on the cluster side. Example columns in the table can include a policy name or identifier column that delineates which set of cloud backup policies included the respective backup item. A LIN column the lists the LIN of the item being backed up. The most recent snapshot identifier associated with the LIN. The timestamp when this record was last updated. Permissions for the item (e.g., read, write, and execute permissions). The item type. In one implementation, the item type can be 1—Regular File; 2—ADS File; 3—Directory; 4—Deleted File; and 5—Deleted Directory. Group ID and User ID columns. A last modified timestamp for the item. A file/item size. It can be appreciated that other columns not depicted can also be recorded for backup items.

Referring now to FIG. 11, there is illustrated an example metadata table in accordance with implementations of this disclosure. FIG. 11 illustrates an example row from a cloud hosted file block location table. A column associated with the LIN can identify the item. A base column can describe the base index for the row. For example, in one implementation, each base index can be associated with a set of 10 data blocks in a base. It can be appreciated that in other implementations a different amount of fixed blocks per based index can be used, such as, for example, 100. The B# column can list for each of the 10 data blocks in the example base (e.g., B0-B9), a cloud hosted object name that contains the block, a starting offset location where the block is located within the object, and a size of the block. It can be appreciated that by knowing the exact locations within an object (including the size of each block), a restoration process could stitch together the complete file block by block.

Figure 4:
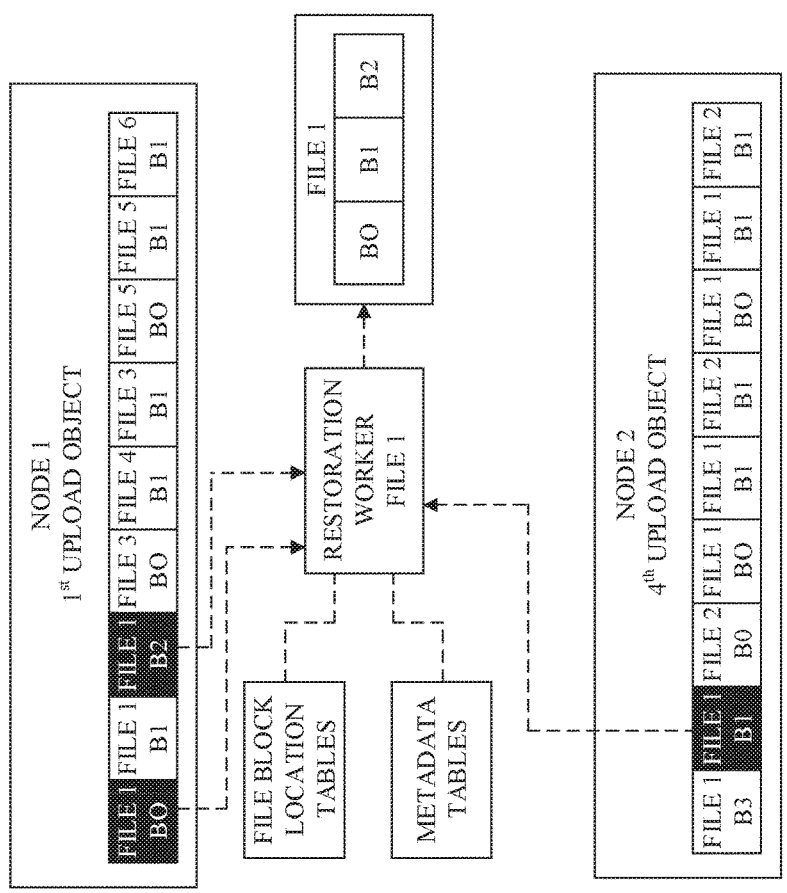
FIG. 4 illustrates an example restoration worker in accordance with implementations of this disclosure.

Referring now to FIG. 4, there is illustrated an example restoration worker in accordance with implementations of this disclosure. In accordance with a restoration process, objects that are needed for restoring are single file or a set of files are identified. As discussed above, if some of the objects necessary for restoration have been moved to cold storage, retrieval of the object from cold storage can be initiated and the restoration can process can continue with restoring files that are not dependent on objects then currently stored within cold storage. Restoration workers can be initiated for restoring a single backup item (e.g., a file). In FIG. 4, Restoration Worker File 1 can look to the metadata tables and the file block location tables to determine the objects needed to restore the file and the block locations within those objects that contain the blocks of the file. In this example, Node 1 $1^{st}$ Upload Object contains Block 0 and Block 2 of the restoration file target (e.g., File 1) and Node 2 $4^{th}$ Upload Object contains Block 1 of the restoration target. The Restoration Worker File 1 can then stitch together the blocks from multiple different offsets from a single upload object and blocks from multiple objects into a restored file.

FIGS. 5-8 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

Figure 5:
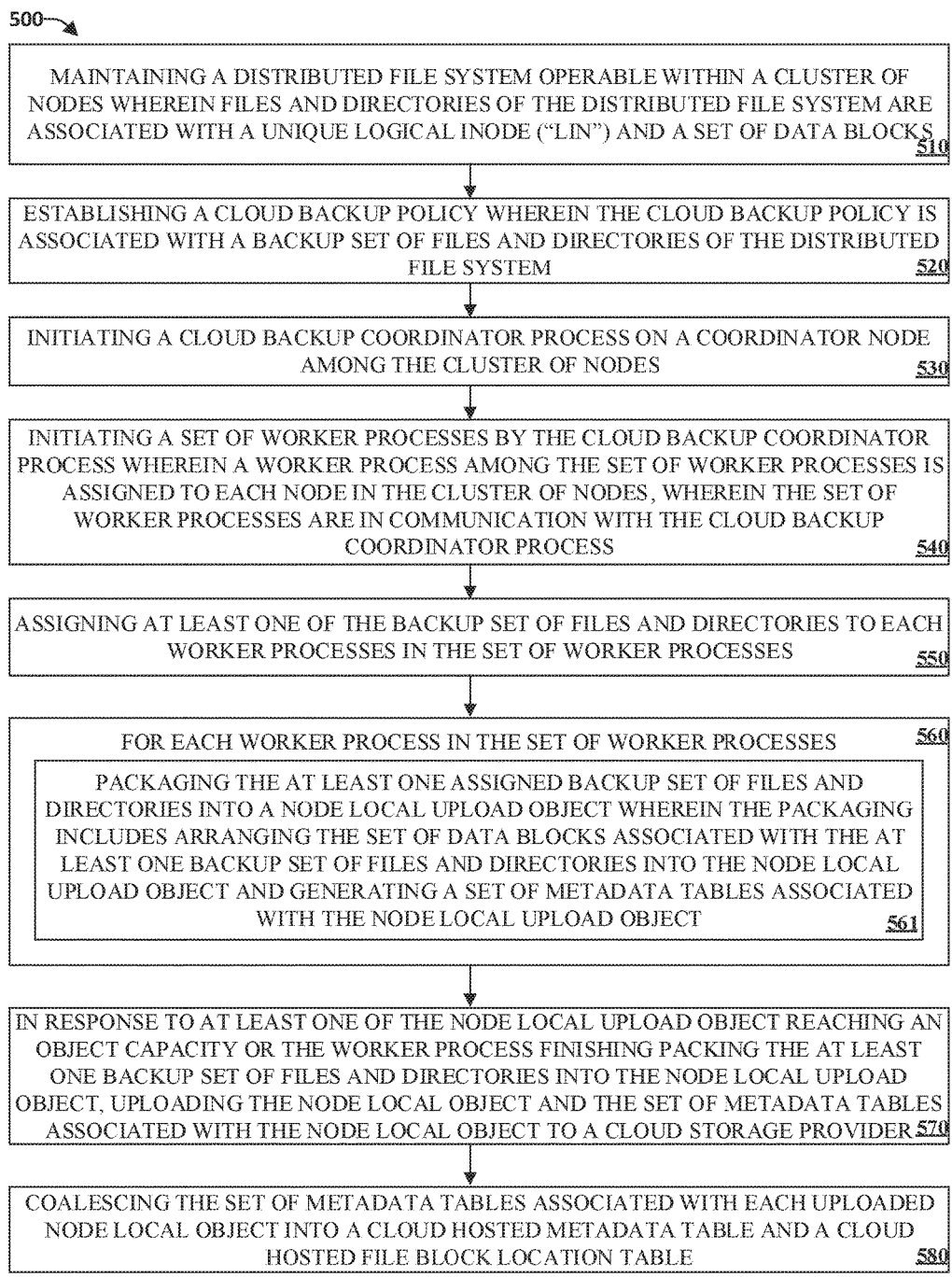
FIG. 5 illustrates an example method for initiating a coordinator and a set of workers to begin a scalable cloud backup in accordance with implementations of this disclosure.

FIG. 5 illustrates an example method for initiating a coordinator and a set of workers to begin a scalable cloud backup in accordance with implementations of this disclosure. At 510, distributed file system operable within a cluster of nodes can be maintained, wherein files and directories of the distributed file system are associated with a unique logical inode ("LIN") and a set of data blocks.

At 520, a cloud backup policy can be established wherein the cloud backup policy is associated with a backup set of files and directories of the distributed file system;

At 530, a cloud backup coordinator process can be initiated on a coordinator node among the cluster of nodes.

At 540, a set of worker processes can be initiated by the cloud backup coordinator process wherein a worker process among the set of worker processes is assigned to each node in the cluster of nodes, wherein the set of worker processes are in communication with the cloud backup coordinator process.

At 550, at least one of the backup set of files and directories can be assigned to each worker processes in the set of worker processes.

At 560, for each worker process in the set of worker processes, at 561 the at least one assigned backup set of files and directories can be packaged into a node local upload object wherein the packaging includes arranging the set of data blocks associated with the at least one backup set of files and directories into the node local upload object and generating a set of metadata tables associated with the node local upload object.

At 570, in response to at least one of the node local upload object reaching an object capacity or the worker process finishing, packaging the at least one backup set of files and directories into the node local upload object, uploading the node local object and the set of metadata tables associated with the node local object to a cloud storage provider.

At 580, the set of metadata tables associated with each uploaded node local object can be coalesced into a cloud hosted metadata table and a cloud hosted file block location table. In one implementation, the cloud hosted file block location table maps sets of a fixed number of blocks from each backed up file to a set of cloud object locations.

Figure 6:
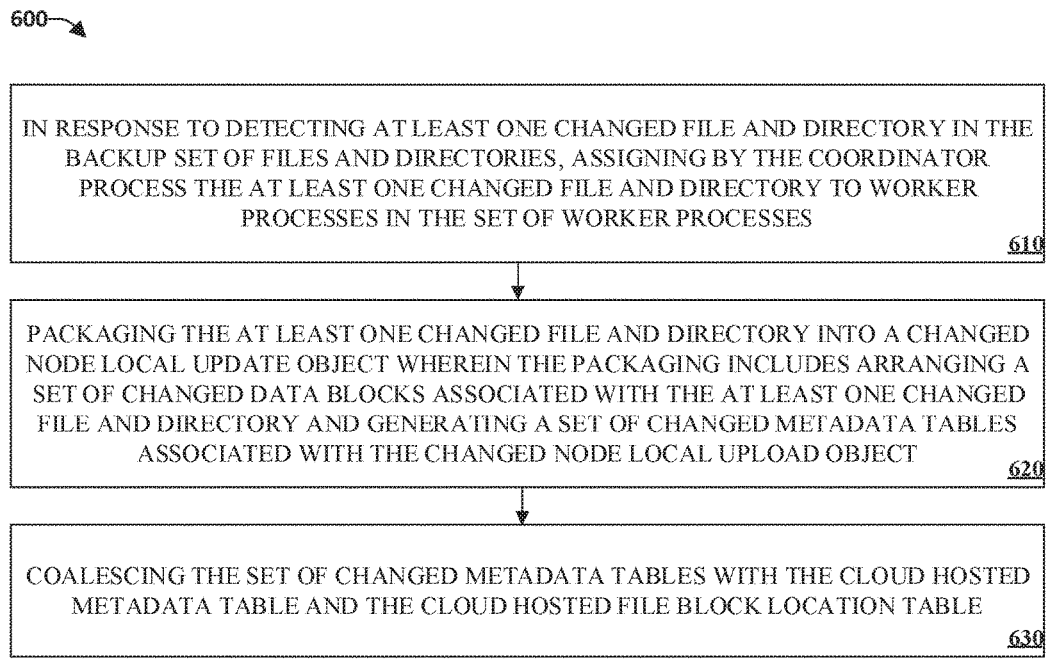
FIG. 6 illustrates an example method for incrementally synching the source cluster of nodes with the cloud backup location in accordance with implementations of this disclosure.

FIG. 6 illustrates an example method for incrementally synching the source cluster of nodes with the cloud backup location in accordance with implementations of this disclosure. At 610, in response to detecting at least one changed file and directory in the backup set of files and directories, assigning by the coordinator process the at least one changed file and directory to worker processes in the set of worker processes.

At 620, the at least one changed file and directory can be packaged into a node local update object wherein the packaging includes arranging a set of changed data blocks associated with the at least one changed file and directory and generating a set of changed metadata tables associated with the changed node local upload object.

At 630, the set of changed metadata tables can be coalesced with the cloud hosted metadata table and the cloud hosted file block location table.

Figure 7:
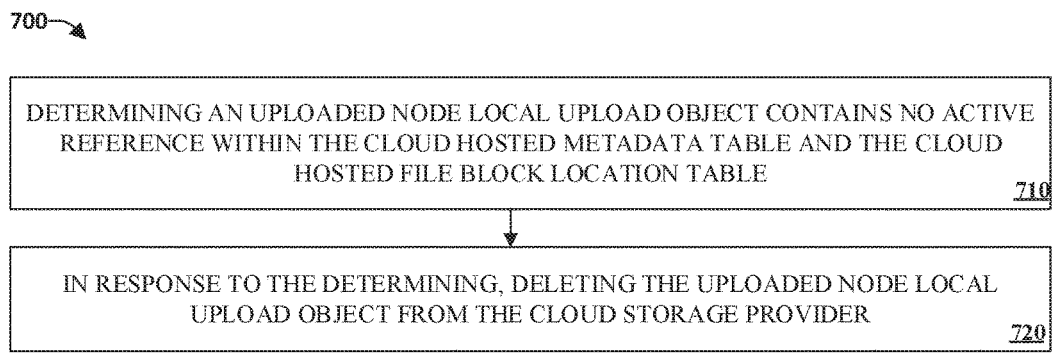
FIG. 7 illustrates an example method for cloud object garbage collection in accordance with implementations of this disclosure.

FIG. 7 illustrates an example method for cloud object garbage collection in accordance with implementations of this disclosure. At 710, an uploaded node local upload object that contains no active references within the cloud hosted metadata table and the cloud hosted file block location table can be determined. At 720, in response to the determination at 710, the uploaded node local object form the cloud storage provider can be deleted.

Figure 8:
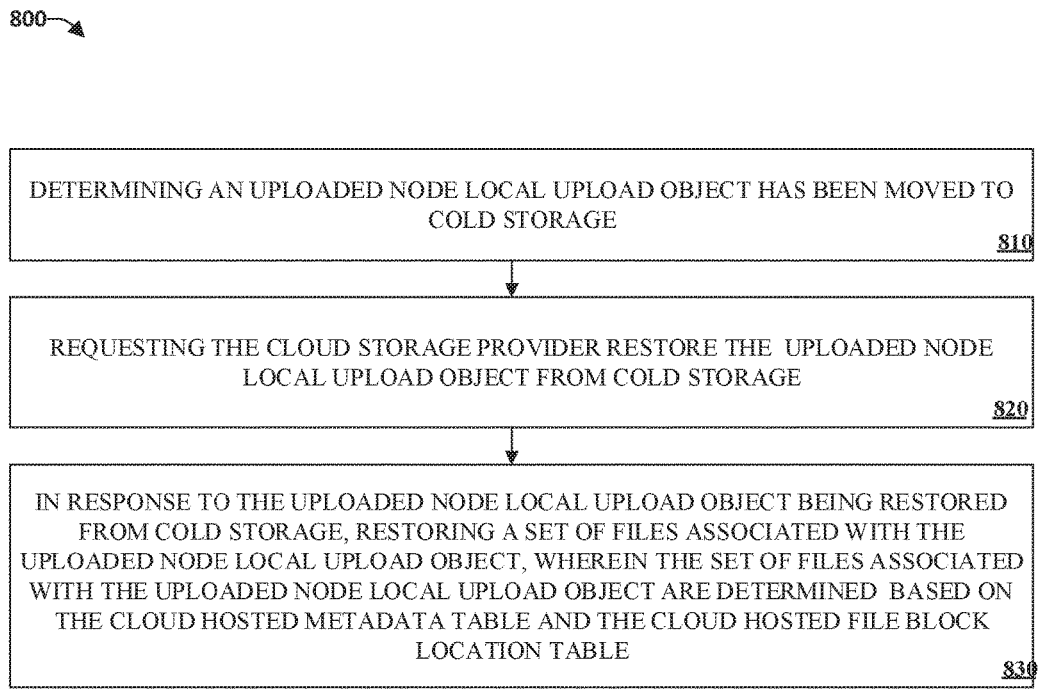
FIG. 8 illustrates an example method for restoration from cold storage in accordance with implementations of this disclosure.

FIG. 8 illustrates an example method for restoration from cold storage in accordance with implementations of this disclosure. At 810, it can be determined whether an uploaded node local upload object has been moved to cold storage. At 820, a request can be sent to the cloud storage provider to restore the uploaded node local upload object from cold storage. At 820, in response to the uploaded node local upload object being restored from cold storage, a set of files associated with the uploaded node local upload object can be restored, wherein the set of files associated with the uploaded node local upload object can be determined based on the cloud hosted metadata table and the cloud hosted file block location table.

Figure 9:
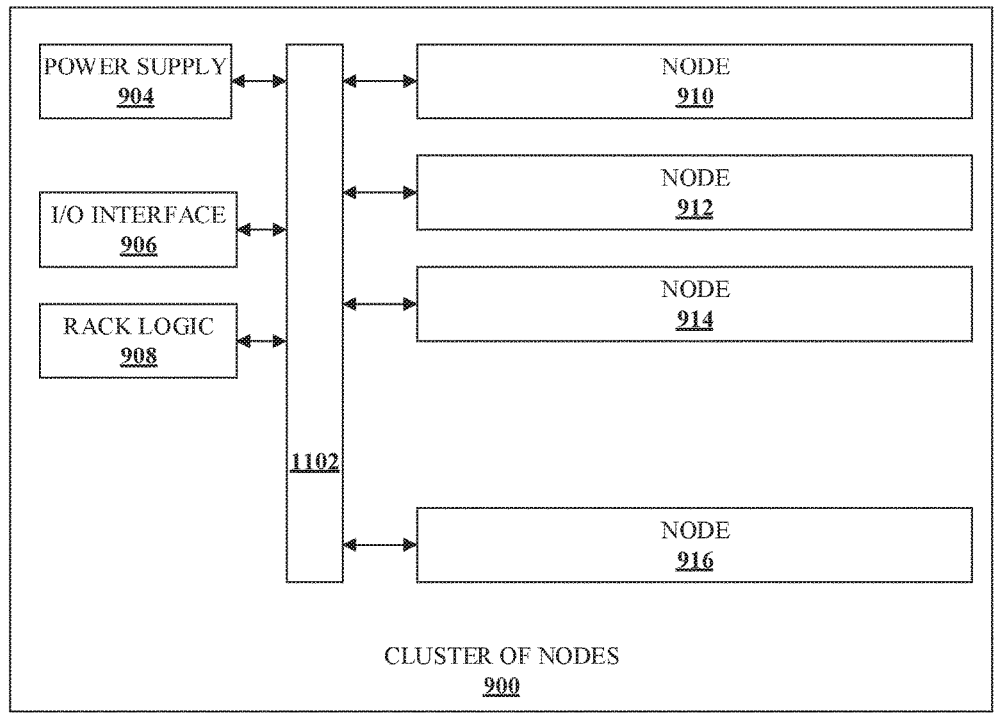
FIG. 9 illustrates an example block diagram of rack of a cluster of nodes in accordance with implementations of this disclosure.

FIG. 9 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 910, 912, 914 and 916 operating in a cluster; however, it can be appreciated that more or less nodes can make up a cluster. It can be further appreciated that nodes among the cluster of nodes do not have to be in a same enclosure as shown for ease of explanation in FIG. 9, and can be geographically disparate. Backplane 902 can be any type of commercially available networking infrastructure that allows nodes among the cluster of nodes to communicate amongst each other in as close to real time as the networking infrastructure allows. It can be appreciated that the backplane 902 can also have a separate power supply, logic, I/O, etc. as necessary to support communication amongst nodes of the cluster of nodes.

As shown in the figure, enclosure 900 contains at least a power supply 904, an input/output interface 906, rack logic 908, several nodes 910, 912, 914, and 916, and backplane 902. Power supply 904 provides power to each component and node within the enclosure. The input/output interface 906 provides internal and external communication for components and nodes within the enclosure. Backplane 908 can enable passive and active communication of power, logic, input signals, and output signals for each node.

It can be appreciated that the Cluster of nodes 900 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 46 disk drive bays with attached disk storage in each bay. It can be appreciated that nodes within the cluster of nodes can have varying configurations and need not be uniform.

Figure 10:
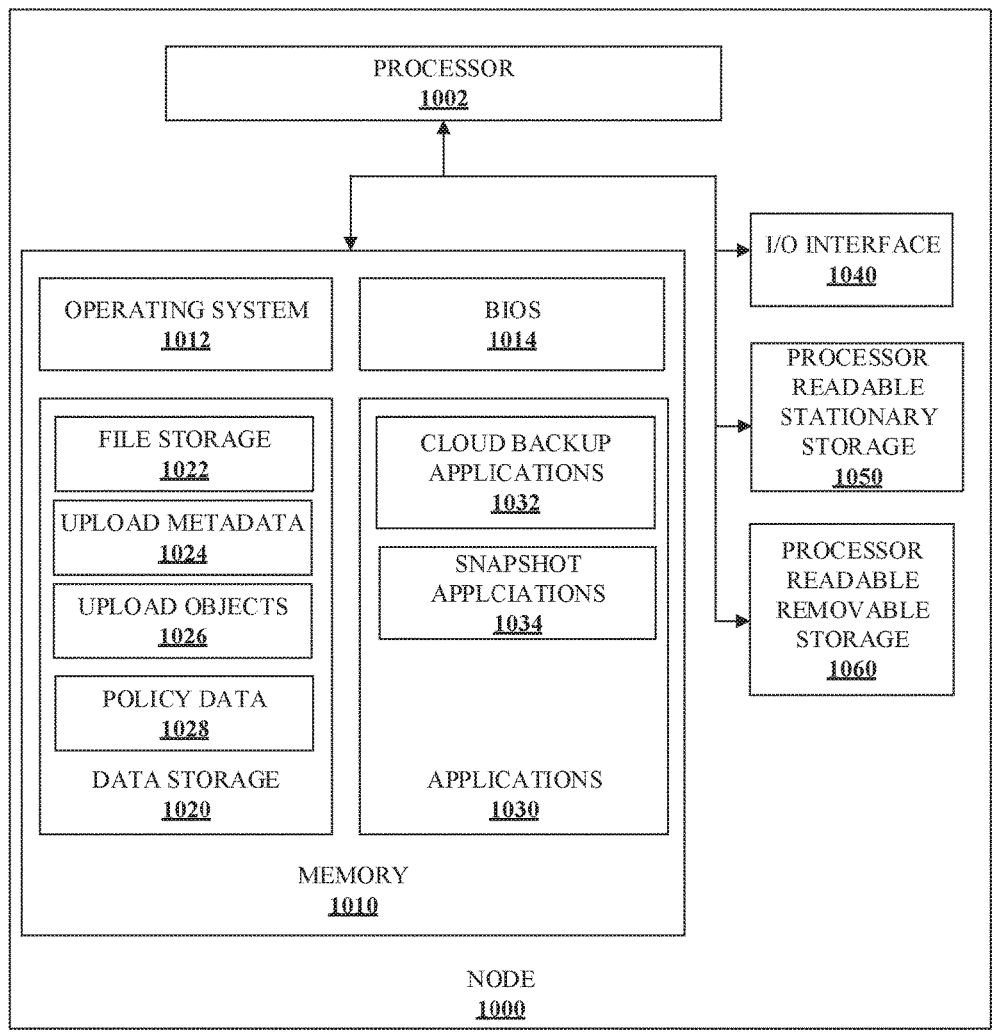
FIG. 10 illustrates an example block diagram of a node in accordance with implementations of this disclosure.

FIG. 10 illustrates an example block diagram of a node 1000 in accordance with implementations of this disclosure. As shown in FIG. 10, a plurality of nodes may be included in one enclosure that shares resources provided by the enclosure to reduce size, power, and cost.

Node 1000 includes processor 1002 which communicates with memory 1010 via a bus. Node 1000 also includes input/output interface 1040, processor-readable stationary storage device(s) 1050, and processor-readable removable storage device(s) 1060. Input/output interface 1040 can enable node 1000 to communicate with other nodes, mobile devices, network devices, and the like. Processor-readable stationary storage device 1050 may include one or more devices such as an electromagnetic storage device (hard disk), solid state hard disk (SSD), hybrid of both an SSD and a hard disk, and the like. In some configurations, a node may include many storage devices. Also, processor-readable removable storage device 1060 enables processor 1002 to read non-transitive storage media for storing and accessing processor-readable instructions, modules, data structures, and other forms of data. The non-transitive storage media may include Flash drives, tape media, floppy media, disc media, and the like.

Memory 1010 may include Random Access Memory (RAM), Read-Only Memory (ROM), hybrid of RAM and ROM, and the like. As shown, memory 1010 includes operating system 1012 and basic input/output system (BIOS) 1014 for enabling the operation of node 1000. In various embodiments, a general-purpose operating system may be employed such as a version of UNIX, LINUX™, FreeBSD, OneFS, a specialized server operating system such as Microsoft's Windows Server™ and Apple Computer's OS X, or the like.

Applications 1030 may include processor executable instructions which, when executed by node 1000, transmit, receive, and/or otherwise process messages, audio, video, and enable communication with other networked computing devices. Examples of application programs include database servers, file servers, calendars, transcoders, and so forth. Applications 1030 may include, for example, cloud backup applications 1032 that support coordinator processes and worker processes and snapshot applications 1034 according to implementations of this disclosure. It can be appreciated that a UI for such application can exists, such as within a web UI for the distributed file system as a whole.

Human interface components (not pictured), may be remotely associated with node 1000, which can enable remote input to and/or output from node 1000. For example, information to a display or from a keyboard can be routed through the input/output interface 1040 to appropriate peripheral human interface components that are remotely located. Examples of peripheral human interface components include, but are not limited to, an audio interface, a display, keypad, pointing device, touch interface, and the like.

Data storage 1020 may reside within memory 1010 as well, storing file storage 1022 data such as metadata or LIN data. It can be appreciated that LIN data and/or metadata can relate to file storage within processor readable stationary storage 1050 and/or processor readable removable storage 1060. For example, LIN data may be cached in cache memory for faster or more efficient frequent access versus being stored within processor readable stationary storage 1050. In addition, Data storage 1020 can also store the upload metadata 1024 and upload objects 1026 in accordance with implementations of this disclosure. Policy data 1028 can be stored within data storage.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
   maintaining a distributed file system operable within a cluster of nodes wherein files and directories of the distributed file system are associated with a unique logical inode ("LIN") and a set of data blocks;
   establishing a cloud backup policy wherein the cloud backup policy is associated with a backup set of files and directories of the distributed file system;
   initiating a cloud backup coordinator process on a coordinator node among the cluster of nodes;
   initiating a set of worker processes by the cloud backup coordinator process wherein a worker process among the set of worker processes is assigned to each node in the cluster of nodes, wherein the set of worker processes are in communication with the cloud backup coordinator process;
   assigning at least one of the backup set of files and directories to each worker processes in the set of worker processes;
   for each worker process in the set of worker processes:
      packaging at least one assigned backup set of files and directories into a node local upload object wherein the packaging includes arranging the set of data blocks associated with the at least one backup set of files and directories into the node local upload object and generating a set of metadata tables associated with the node local upload object;
   in response to at least one of the node local upload object reaching an object capacity or the worker process finishing packing the at least one backup set of files and directories into the node local upload object, uploading the node local object and the set of metadata tables associated with the node local object to a cloud storage provider; and
   coalescing the set of metadata tables associated with each uploaded node local object into a cloud hosted metadata table and a cloud hosted file block location table.

2. The method of claim 1, wherein the cloud hosted metadata table includes an entry for each backed up file and wherein each file entry includes at least a cloud backup policy name, a LIN, a file path, a snapshot identifier, a timestamp, a set of file permissions, a file type, a group identifier, a user identifier, a last modification time, a parent LIN, and a file size.

3. The method of claim 1, wherein the cloud hosted file block location table maps sets of a fixed number of blocks from each backed up file to a set of cloud object locations.

4. The method of claim 1, further comprising:

In response to detecting at least one changed file and directory in the backup set of files and directories, assigning by the coordinator process the at least one changed file and directory to worker processes in the set of worker processes;

Packaging the at least one changed file and directory into a changed node local update object wherein the packaging includes arranging a set of changed data blocks associated with the at least one changed file and directory and generating a set of changed metadata tables associated with the changed node local upload object; and coalescing the set of changed metadata tables with the cloud hosted metadata table and the cloud hosted file block location table.

5. The method of claim 4, further comprising:

determining an uploaded node local upload object contains no active reference within the cloud hosted metadata table and the cloud hosted file block location table;

in response to the determining, delating the uploaded node local upload object from the cloud storage provider.

6. The method of claim 1, further comprising:

determining an uploaded node local upload object has been moved to cold storage;

requesting the cloud storage provider restore the uploaded node local upload object from cold storage;

in response to the uploaded node local upload object being restored from cold storage, restoring a set of files associated with the uploaded node local upload object, wherein the set of files associated with the uploaded node local object are determined based on the cloud hosted metadata table and the cloud hosted file block location table.

7. A system comprising at least one storage device and at least one hardware processor configured to:

maintaining a distributed file system operable within a cluster of nodes wherein files and directories of the distributed file system are associated with a unique logical inode ("LIN") and a set of data blocks;

establishing a cloud backup policy wherein the cloud backup policy is associated with a backup set of files and directories of the distributed file system;

initiating a cloud backup coordinator process on a coordinator node among the cluster of nodes;

initiating a set of worker processes by the cloud backup coordinator process wherein a worker process among the set of worker processes is assigned to each node in the cluster of nodes, wherein the set of worker processes are in communication with the cloud backup coordinator process;

assigning at least one of the backup set of files and directories to each worker processes in the set of worker processes;

for each worker process in the set of worker processes:

packaging at least one assigned backup set of files and directories into a node local upload object wherein the packaging includes arranging the set of data blocks associated with the at least one backup set of files and directories into the node local upload object and generating a set of metadata tables associated with the node local upload object;

in response to at least one of the node local upload object reaching an object capacity or the worker process finishing packing the at least one backup set of files and directories into the node local upload object, uploading the node local object and the set of metadata tables associated with the node local object to a cloud storage provider; and coalescing the set of metadata tables associated with each uploaded node local object into a cloud hosted metadata table and a cloud hosted file block location table.

8. The system of claim 7, wherein the cloud hosted metadata table includes an entry for each backed up file and wherein each file entry includes at least a cloud backup policy name, a LIN, a file path, a snapshot identifier, a timestamp, a set of file permissions, a file type, a group identifier, a user identifier, a last modification time, a parent LIN, and a file size.

9. The system of claim 7, wherein the cloud hosted file block location table maps sets of a fixed number of blocks from each backed up file to a set of cloud object locations.

10. The system of claim 7, further configured to:

In response to detecting at least one changed file and directory in the backup set of files and directories, assigning by the coordinator process the at least one changed file and directory to worker processes in the set of worker processes;

Packaging the at least one changed file and directory into a changed node local update object wherein the packaging includes arranging a set of changed data blocks associated with the at least one changed file and directory and generating a set of changed metadata tables associated with the changed node local upload object; and coalescing the set of changed metadata tables with the cloud hosted metadata table and the cloud hosted file block location table.

11. The system of claim 10, further configured to:

determining an uploaded node local upload object contains no active reference within the cloud hosted metadata table and the cloud hosted file block location table;

in response to the determining, delating the uploaded node local upload object from the cloud storage provider.

12. The system of claim 7, further configured to:

determining an uploaded node local upload object has been moved to cold storage;

requesting the cloud storage provider restore the uploaded node local upload object from cold storage;

in response to the uploaded node local upload object being restored from cold storage, restoring a set of files associated with the uploaded node local upload object, wherein the set of files associated with the uploaded node local object are determined based on the cloud hosted metadata table and the cloud hosted file block location table.

13. A non-transitory computer readable medium with program instructions stored thereon to cause a computer to perform the following acts:

maintaining a distributed file system operable within a cluster of nodes wherein files and directories of the distributed file system are associated with a unique logical inode ("LIN") and a set of data blocks;

establishing a cloud backup policy wherein the cloud backup policy is associated with a backup set of files and directories of the distributed file system;

initiating a cloud backup coordinator process on a coordinator node among the cluster of nodes;

initiating a set of worker processes by the cloud backup coordinator process wherein a worker process among the set of worker processes is assigned to each node in the cluster of nodes, wherein the set of worker processes are in communication with the cloud backup coordinator process;

assigning at least one of the backup set of files and directories to each worker processes in the set of worker processes;

for each worker process in the set of worker processes:

packaging at least one assigned backup set of files and directories into a node local upload object wherein the packaging includes arranging the set of data blocks associated with the at least one backup set of files and directories into the node local upload object and generating a set of metadata tables associated with the node local upload object;

in response to at least one of the node local upload object reaching an object capacity or the worker process finishing packing the at least one backup set of files and directories into the node local upload object, uploading the node local object and the set of metadata tables associated with the node local object to a cloud storage provider; and coalescing the set of metadata tables associated with each uploaded node local object into a cloud hosted metadata table and a cloud hosted file block location table.

14. The non-transitory computer readable medium of claim 13, wherein the cloud hosted metadata table includes an entry for each backed up file and wherein each file entry includes at least a cloud backup policy name, a LIN, a file path, a snapshot identifier, a timestamp, a set of file permissions, a file type, a group identifier, a user identifier, a last modification time, a parent LIN, and a file size.

15. The non-transitory computer readable medium of claim 13, wherein the cloud hosted file block location table maps sets of a fixed number of blocks from each backed up file to a set of cloud object locations.

16. The non-transitory computer readable medium of claim 13, with program instructions stored thereon to further cause a computer to perform the following acts:

In response to detecting at least one changed file and directory in the backup set of files and directories, assigning by the coordinator process the at least one changed file and directory to worker processes in the set of worker processes;

Packaging the at least one changed file and directory into a changed node local update object wherein the packaging includes arranging a set of changed data blocks associated with the at least one changed file and directory and generating a set of changed metadata tables associated with the changed node local upload object; and coalescing the set of changed metadata tables with the cloud hosted metadata table and the cloud hosted file block location table.

17. The non-transitory computer readable medium of claim 16, with program instructions stored thereon to further cause a computer to perform the following acts:

determining an uploaded node local upload object contains no active reference within the cloud hosted metadata table and the cloud hosted file block location table;

in response to the determining, delating the uploaded node local upload object from the cloud storage provider.

18. The non-transitory computer readable medium of claim 13, with program instructions stored thereon to further cause a computer to perform the following acts:

determining an uploaded node local upload object has been moved to cold storage;

requesting the cloud storage provider restore the uploaded node local upload object from cold storage;

in response to the uploaded node local upload object being restored from cold storage, restoring a set of files associated with the uploaded node local upload object, wherein the set of files associated with the uploaded node local object are determined based on the cloud hosted metadata table and the cloud hosted file block location table.

\* \* \* \* \*